(12) United States Patent
Lilleberg et al.

(10) Patent No.: US 9,461,792 B2
(45) Date of Patent: Oct. 4, 2016

(54) SIGNALING AND PROCEDURE DESIGN FOR CELLULAR CLUSTER CONTENDING ON LICENSE-EXEMPT BANDS

(75) Inventors: Jorma Lilleberg, Oulu (FI); Haifeng Wang, Shanghai (CN); Ting Zhou, Shanghai (CN); Zhenhong Li, Shanghai (CN); Jing Xu, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 284 days.

(21) Appl. No.: 14/235,180

(22) PCT Filed: Jul. 28, 2011

(86) PCT No.: PCT/CN2011/077721
§ 371 (c)(1),
(2), (4) Date: May 21, 2014

(87) PCT Pub. No.: WO2013/013409
PCT Pub. Date: Jan. 31, 2013

(65) Prior Publication Data
US 2014/0313949 A1    Oct. 23, 2014

(51) Int. Cl.
| | | |
|---|---|---|
| H04L 5/00 | (2006.01) | |
| H04W 28/06 | (2009.01) | |
| H04L 5/14 | (2006.01) | |
| H04W 76/02 | (2009.01) | |

(52) U.S. Cl.
CPC .......... *H04L 5/0037* (2013.01); *H04L 5/1469* (2013.01); *H04W 28/065* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 8,094,573 B2 | 1/2012 | Avidor et al. | |
| 2004/0116120 A1* | 6/2004 | Gallagher | H04W 60/04 455/436 |
| 2004/0240525 A1* | 12/2004 | Karabinis | H04B 7/2637 375/132 |
| 2006/0258358 A1* | 11/2006 | Kallio | H04W 36/0066 455/437 |
| 2007/0105576 A1* | 5/2007 | Gupta | H04W 52/243 455/509 |
| 2007/0133483 A1* | 6/2007 | Lee | H04W 52/32 370/338 |
| 2007/0233835 A1* | 10/2007 | Kushalnagar | H04L 12/12 709/223 |
| 2009/0028119 A1* | 1/2009 | Avidor | H04W 72/1247 370/338 |

FOREIGN PATENT DOCUMENTS

CN    102111256    6/2011

* cited by examiner

Primary Examiner — Jenee Williams
(74) Attorney, Agent, or Firm — Oblon, McClelland, Maier & Neustadt, L.L.P.

(57) ABSTRACT

The specification and drawings present a new method, apparatus and software related product (e.g., computer readable memory) for implementing a device-to-device communication of cellular, e.g., LTE, wireless devices on a shared band (e.g., ISM 2.4 GHz band), including the signaling and procedure design for contending or coordinating with the already existing radio systems (e.g., WLAN systems).

20 Claims, 9 Drawing Sheets

SIGNALING AND PROCEDURE DESIGN FOR CELLULAR CLUSTER CONTENDING ON LICENSE-EXEMPT BANDS

TECHNICAL FIELD

The exemplary and non-limiting embodiments of this invention relate generally to wireless communications and more specifically to implementing a device-to-device communication of cellular devices, e.g., in LTE wireless systems on a shared band (e.g., ISM 2.4 GHz band).

BACKGROUND ART

The following abbreviations that may be found in the specification and/or the drawing figures are defined as follows:

3GPP: third generation partnership project
CA: carrier aggregation
CH: cluster head (e.g., user equipment) of a cluster
C-RNTI: cell radio network temporary identifier
CS: carrier sensing
CSMA/CA: carrier sense multiple access with collision avoidance
CTS: clear-to-send
DCF: distributed coordination function
DIFS: DCF inter-frame space
D2D: device-to-device
eNB: evolved node B/base station in an E-UTRAN system
E-UTRAN evolved UTRAN (LTE)
FCS: frame check sequence
ISM: industrial, scientific, medical
LTE: long term evolution
LTE-A LTE-Advanced
NAV: net allocation vector
MAC medium access control
MTM: machine-to-machine
PCF: point coordination function
PIFS: PCF inter-frame space
RA: receiving STA address
RTS: request-to-send
SIFS: short inter-frame space
STA: station
TA: transmitting STA address
UE: user equipment
UTRAN universal terrestrial radio access network Wireless data traffic is expected in the near future to more fully exploit license-exempt spectrum, sometimes termed shared frequency bands. For example, ISM (Industrial Scientific Medical) bands, which have 2.4 GHz or 5.8 GHz frequency bands, are shared bands.

The device-to-device (D2D) communication enables new service opportunities and reduces the eNB load for short range data intensive peer-to-peer communications. The possibility and benefits of the D2D communications as an underlay of an LTE-A (LTE-Advanced) network have been investigated and proved by some current literatures, e.g., see Chia-Hao Yu, Olav Tirkkonen, Klaus Doppler, et al., "On the performance of Device-to-Device underlay communication with simple power control", IEEE 69th Vehicular Technology Conference, VTC '09, 1-5, Apr. 2009, and Klaus Doppler, Mika P. Rinne, Pekka Janis, et al., "Device-to-Device communications; functional prospects for LTE-Advanced networks", IEEE International Conference on Communications Workshops, ICC '09, 1-6, Jun. 2009.

Furthermore, WLANs (wireless local area networks) become more and more popular in homes, offices, restaurants, shopping malls, etc. due to ease of installation and growing demand. The necessary and primary function in IEEE 802.11 WLAN infrastructures is a DCF (Distributed Coordination Function). This function does not have a center node to control the channel access. All stations (STAs) contend for the channel equally by using CSMA/CA (Carrier Sense Multiple Access with Collision Avoidance), as described, e.g., in the IEEE 802.11 specification: IEEE Std 802.11™-2007, "Wireless LAN Medium Access Control (MAC) and Physical Layer (PHY) Specifications".

The basic CSMA/CA (Carrier Sense Multiple Access with Collision Avoidance) access for the DCF is shown in the FIG. 1: a STA senses the spectrum in a channel before starting any transmission. When the spectrum is free, the STA still wait for a DIFS (DCF inter-frame space) and a random back-off window to avoid multiple STAs transmitting the frame simultaneously. After the back-off window expires, the STA could access the channel.

The basic CSMA/CA cannot overcome a "hidden-terminal" problem. FIG. 2 illustrates such a problem. STA1 first senses the channel and finds that the channel is free, such that after DIFS and backoff window expire, it begins to transmit data to STA2. On the other hand, STA3 has already occupied the channel and is transmitting data to STA4. Due to path-loss, STA1 cannot hear STA3 but STA2 can hear STA3. As a result, the signals from STA1 and STA3 are collided. In order to solve this problem, an extended CSMA/CA mechanism is specified in the IEEE 802.11.

The extended CSMA/CA mechanism is a virtual CS (carrier sensing) mechanism by introducing a RTS (request-to-send) frame and a CTS (clear-to-send) frame and updating the NAV (network allocation vector) in all 802.11 STAs. Both RTS and CTS and other MAC frames contain a duration field which indicates how long the channel is busy. This is demonstrated in FIG. 3. The RTS and CTS frame structures are shown in FIG. 4, where RA, TA and FCS are fields indicating receiving station address, transmitting station address and frame check sequence, respectively.

Multiple radio systems, including LTE wireless systems (e.g., TDD (time division duplex) version of LTE known as TD-LTE) can operate in these frequency bands with the limitation that all the systems must follow the etiquette defined for the ISM band. How to coordinate band sharing with WLAN systems to avoid severe interference or contention is an important problem to be solved. The embodiments of the present invention provide a solution for such a challenge.

SUMMARY

According to a first aspect of the invention, a method comprises: for a plurality of user equipments in a cluster: selecting a channel in a license-exempt frequency band; determining which user equipment is to send a request message on the channel; determining which user equipment is to reply to the request message with a clear message; and compiling a contend-prepare message comprising an indication of the selected channel and indications of the user equipments to send request and clear messages for transmission of the contend-prepare message on a cellular band.

According further to the first aspect of the invention, the license-exempt frequency band may be an industrial-scientific-medical band used by a wireless local area network.

Still further according to the first aspect of the invention, the cluster may be in a cellular system which is a long term evolution cellular system, a long term evolution advanced cellular system or a time division duplex long term evolution cellular system.

According yet further to the first aspect of the invention, before the selecting, the method may comprise: receiving a request from a Node B to establish a wireless communication within the cluster in the license-exempt frequency band.

According still further to the first aspect of the invention, the selecting the channel may be based on a lack of any signal or a minimum signal interference compared to other channels in the license-exempt frequency band.

According yet still further to the first aspect of the invention, a wireless communication on the channel may be a unicast communication between two user equipments in the cluster. Further, the contend-prepare message may be sent on the cellular band by a cluster head of the cluster at least to the two user equipments in the cluster indicating that a first user equipment of the two user equipments is selected to send the request message and a second user equipment of the two user equipments is selected to reply with the clear message, the contend-prepare message may comprise an indication whether the first user equipment has a medium access control address of the second user equipment, wherein, in response to the contend-prepare message, the medium access control address of the second user equipment may be recovered from a memory of the first user equipment or provided to the first user equipment by the second user equipment. Still further, the unicast communication between the two user equipments of the cluster may be ready to start on the channel after: sensing the channel by the first user equipment, sending the request message comprising the medium access control address of the second user equipment by the first user equipment to the second user equipment, and receiving the clear message by the first user equipment from the second user equipment. Yet still further, the method may further comprise: receiving, by the cluster head, a contending success indication from the first user equipment; scheduling and assigning, by the cluster head, a resource in the cluster; and sending, by the cluster head, a confirmation of successful contending including a transmission time duration on the channel in the license-exempt frequency band.

According yet further still to the first aspect of the invention, a wireless communication on the channel may be a multicast communication between the cluster head and one or more user equipments of the cluster. Further, the contend-prepare message may be sent on the cellular band by a cluster head of the cluster to other user equipments of the cluster indicating that the cluster head is selected to send the request message and the other user equipments of the cluster are selected to reply with the clear message, the contend-prepare message may comprise indication whether the other user equipments have a medium access control address of the cluster head, wherein, in response to the contend-prepare message, the medium access control address of the cluster head may be recovered from memories of the other user equipments or provided to the other user equipments by the cluster head. Still further, the multicast communication between the cluster head and at least two user equipments of the cluster may be ready to start on the channel after: sensing the channel by the cluster head, sending, by the cluster head, the request message comprising the medium access control address of the cluster head to the other user equipments of the cluster, and receiving the clear message by the cluster head from the one or more user equipments of the other user equipments. Yet still further, the method may further comprise: scheduling and assigning, by the cluster head, a resource in the cluster; and sending, by the cluster head, a confirmation of successful contending including a transmission time duration on the channel in the license-exempt frequency band.

Yet still further according to the first aspect of the invention, the contend-prepare message may comprise an indication of a transmission time duration on the selected channel, the transmission time duration being determined according to traffic requirements.

According to a second aspect of the invention, an apparatus comprises: a processing system comprising at least one processor and a memory storing a set of computer instructions, in which the processing system is arranged to: select a channel in a license-exempt frequency band; determine which user equipment is to send a request message on the channel; determine which user equipment is to reply to the request message with a clear message; and compile a contend-prepare message comprising an indication of the selected channel and indications of the user equipments to send request and clear messages for transmission of the contend-prepare message on a cellular band.

Still further according to the second aspect of the invention, the apparatus may further comprises a memory configured to store the shared channel application.

According further still to the second aspect of the invention, the apparatus may be configured to receive a request from a Node B to establish a wireless communication within the cluster in the license-exempt frequency band.

According yet further still to the second aspect of the invention, the license-exempt frequency band may be an industrial-scientific-medical band used by a wireless local area network.

According still yet further to the second aspect of the invention, the selecting the channel by the apparatus may be based on a lack of any signal or a minimum signal interference compared to other channels in the license-exempt frequency band.

According to a third aspect of the invention, a computer readable memory encoded with a computer program comprising computer readable instructions recorded thereon which when executed results in actions which comprise: for a plurality of user equipments in a cluster: selecting a channel in a license-exempt frequency band; determining which user equipment is to send a request message on the channel; determining which user equipment is to reply to the request message with a clear message; and compiling a contend-prepare message comprising an indication of the selected channel and indications of the user equipments to send request and clear messages for transmission of the contend-prepare message on a cellular band.

BRIEF DESCRIPTION OF THE DRAWINGS

For a better understanding of the nature and objects of the present invention, reference is made to the following detailed description taken in conjunction with the following drawings, in which.

DETAILED DESCRIPTION

A new method, apparatus, and software related product (e.g., or a computer readable memory) are presented for implementing a device-to-device (D2D) communication of cellular, e.g., LTE, wireless devices on a shared band, including the signaling and procedure design for contending or coordinating with the already existing radio systems (e.g., WLAN systems).

Current LTE/LTE-A specifications do not include a solution for coordinating band sharing with, e.g., WLAN systems to avoid severe interference or contention. Some straightforward schemes may be contemplated.

For example, LTE UEs may first sense the shared band. If they find the shared band to be free, the LTE UEs may start D2D transmission on the shared band if they want. Such scheme is too aggressive to WLAN systems. If the LTE UEs find a free channel in the 2.4 GHz band, they occupy the channel as long as they want. If the D2D transmission is large, e.g. downloading a movie, the channel will be occupied for a long time and other systems like WLAN will not be able to use the channel.

Periodically sensing and occupying the shared band with a limited duration may be another approach. In other words, if LTE UEs find a free channel in the shared band through sensing, they occupy the channel with a limited duration. After that they release the channel and sense again. This scheme is not fair to the WLAN systems. In WLAN systems, STAs first sense the channel and if the channel is free, they still need to wait for DIFS plus random back-off window until they occupy the channel. The straight forward scheme here means the LTE UEs do not wait for DIPS plus random back-off window, they occupy the channel as soon as they find it is free. This makes a larger probability for the LTE UEs to occupy the channel than for the WLAN STAs. Another problem of this approach is the multiple LTE UEs contending problem. If multiple LTE UEs sense the channel at the same time and find it is free, they may transmit on the channel simultaneously and the transmission can collide.

These straightforward schemes have their drawbacks due to no coordination with other systems on the shared band. The embodiments of this invention consider the coordination with WLAN systems so that LTE UEs can contend to use the shared band fairly and efficiently.

Figure 5:
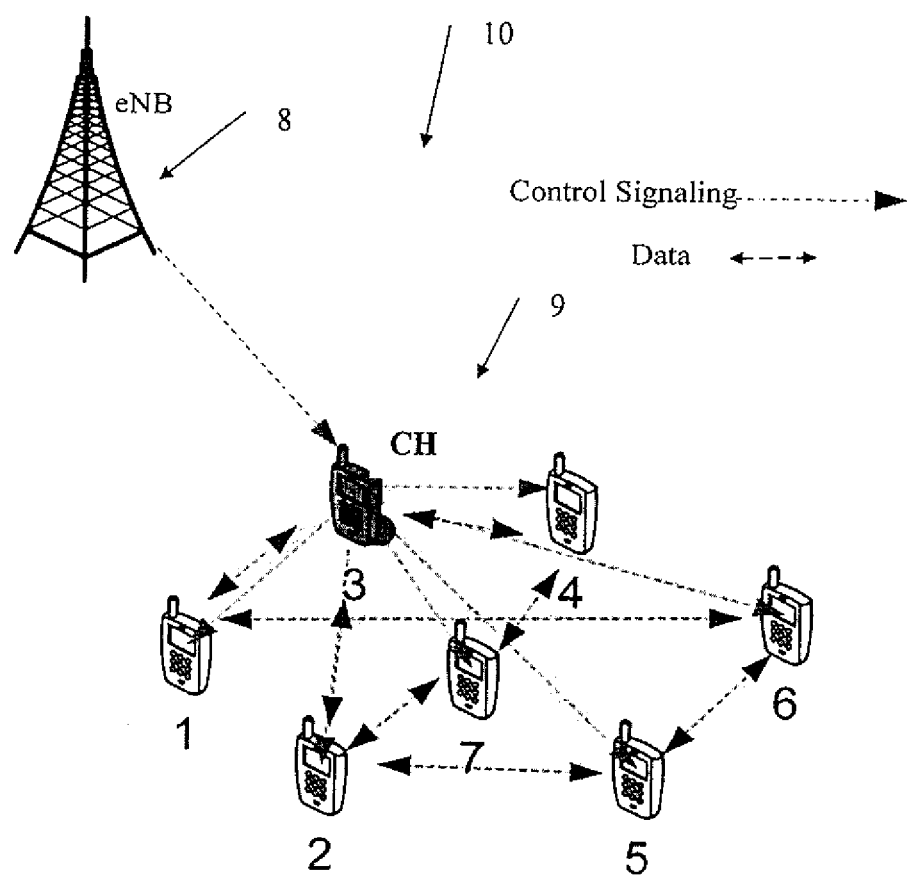
FIG. 5 is a diagram of a distributed D2D (device-to-device) cluster with a cluster head (CH) used for implementing embodiments of the invention.

A typical scenario which may be used according to an embodiment of the invention is illustrated in FIG. 5. FIG. 5 shows an example among others of a diagram of a distributed D2D cluster 9 in an LTE wireless system/network 10 with a UE cluster head 3 managing other devices (e.g., user equipments, UEs) 1, 2 and 4-7 of the cluster 9. In a distributed D2D cluster 9 with the CH 3 set up in a cellular system 10 only the CH 3 has a connection with the eNB (or generally Node B) 8. The other UEs 1, 2 and 4-7 are under the CH 3 management. The eNB 8 may allocate a radio (cellular) resource to the CH 3 and the CH 3 is then responsible for scheduling the D2D communication using this radio resource within the cluster 9 which provides a normal operation of the cellular system/network. But in addition, the eNB 8 may provide an instruction/request to the CH 8 to attempt using a shared band for communicating wirelessly within the cluster 9 to relieve load on the cellular system. For example, the cluster 9 may have a unicast service and/or a multicast service.

According to an embodiment of the invention, in response to a request from the eNB 8 to use a shared band for communicating within the cluster 9, the CH 3 initiates a signaling procedure for the D2D cluster 9 to contend for the shared band. Alternatively according to a further embodiment, the CH 3 may initiate this signaling without a specific request from the eNB 8, e.g., using a standing or a default procedure.

The cluster head (CH) 3 may first search the shared band and select a contending channel using a pre-defined criterion, e.g., no interfering signal or a minimum interfering energy/signal in the channel. Then the CH 3 may generate and send an ISM_contend_prepare signaling/message which in an exemplary embodiment has the main information items shown in Table 1 to the cluster members UEs 1, 2 and 4-7 of FIG. 5. The ISM_contend_prepare message comprises a transmission time duration for the shared channel operation, which may be estimated by the CH 3 according to traffic requirements (e.g., being 32 ms or less).

TABLE 1

An example of information items of ISM_contend_prepare signaling.

| Information item | Description | Length |
|---|---|---|
| Service type | Multicast or unicast service requiring the ISM bands | 1 bit 0 for unicast, 1 for multicast |
| RTS sender | The chosen UE id for sending RTS frame. If cluster head is involved in the contending procedure, it is always assigned as the RTS sender | 16 bit The corresponding UE's C-RNTI |
| CTS sender | The chosen UE id for sending CTS frame. If service type is Multicast, this field is set as the cluster head id. | 16 bit The corresponding UE's C-RNTI |
| Duration | Maximum value of 32 ms or an estmation of the transmission time according to the traffic requirement. | 5 bit |
| Contending Channel | The channel number of the ISM band | According to the candidate channel number |
| MAC address flag | Whether the MAC address of the involved UEs needs exchange | 1 bit 0 for yes, 1 for no |

Figure 1:
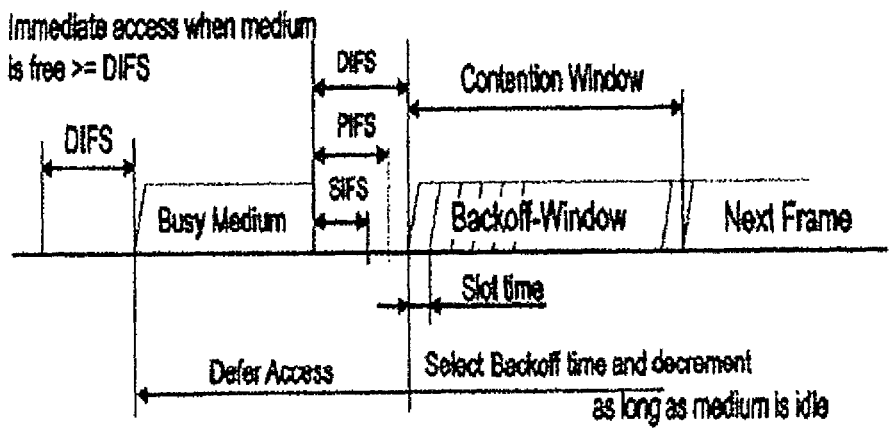
FIG. 1 is a time diagram demonstrating basic CSMA/CA mechanism per IEEE 802.11 specification.
Figure 2:
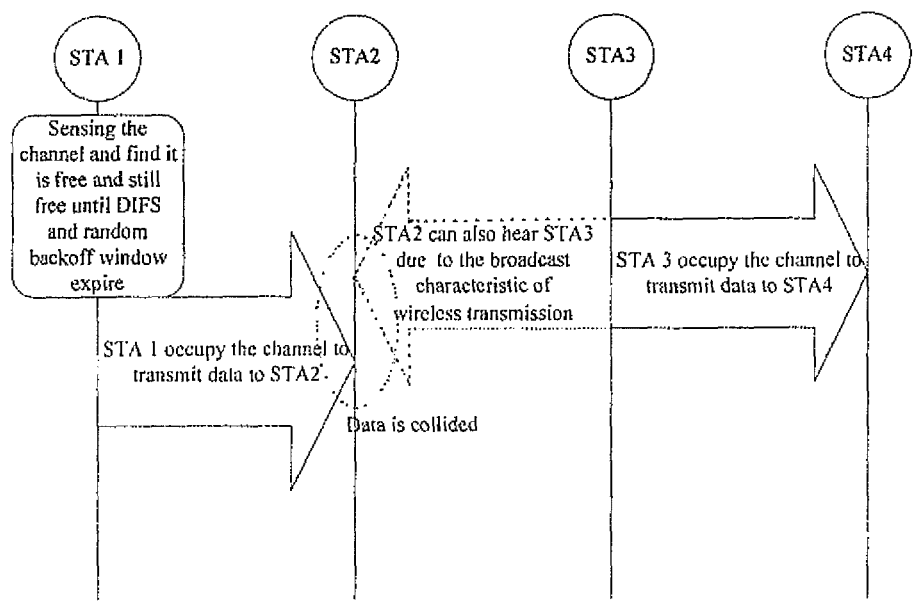
FIG. 2 is a signal flow diagram demonstrating "hidden problem" of WLAN utilizing basic CSMA/CA mechanism shown in FIG. 1.
Figure 3:
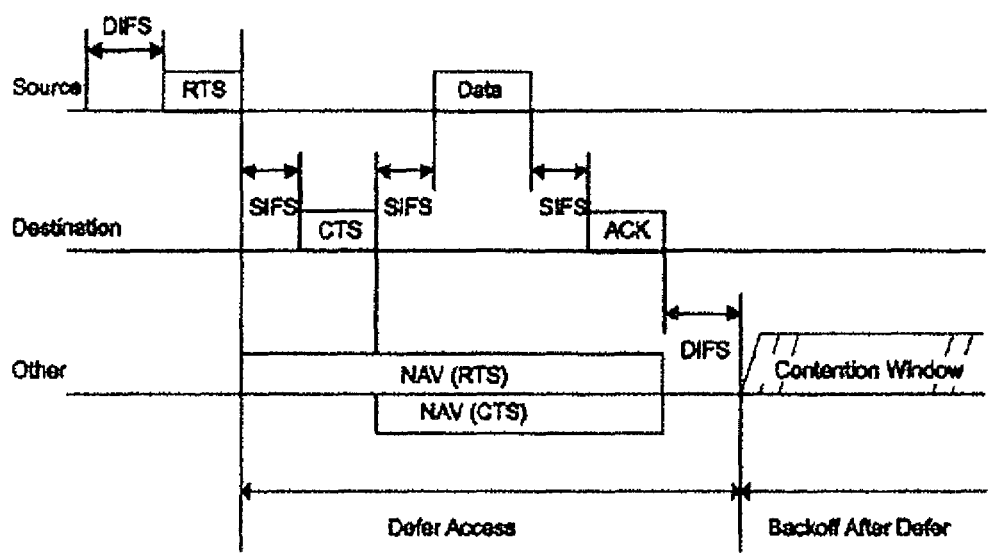
FIG. 3 is a time diagram demonstrating extended CSMA/CA mechanism per IEEE 802.11 specification.
Figure 4A:
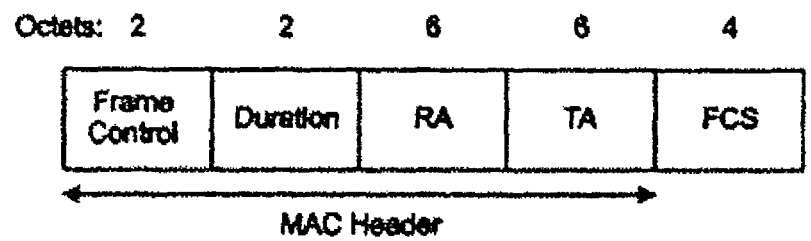
FIGS. 4a and 4b are diagrams demonstrating RTS frame structure shown in FIG. 4a and the CTS frame structure shown in FIG. 4b.
Figure 4B:
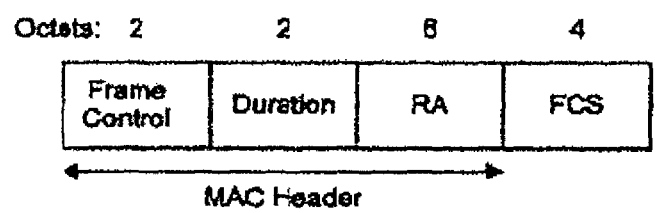

Then the UEs of the cluster 9 involved in the contending (e.g., the RTS/CTS senders identified in the ISM_contend_prepare message for the unicast service and all the UEs for the multicast service) may start a CSMA/CA procedure as virtual WLAN terminals. This procedure is further disclosed in detail for the unicast service in FIGS. 6a and 6b and Table 2 and for the multicast service in FIGS. 7a and 7b and Table 3, as discussed below. The CSMA/CA procedure may follow the extended CSMA/CA mechanism as shown in and described herein in reference to FIGS. 3 and 4 shown herein, per IEEE 802.11 protocol for the WLAN devices. It is noted that for implementing embodiments of the present invention, the UE devices 1-7 of the cluster 9 may be configured to support WLAN RTS/CTS functions. Also, it is further noted that in order to implement various embodiments of the invention the CH 3 and other UEs of the cluster 9 should be able to support a wireless communication using at least two bands: at least one band for radio cellular communication and another band for the at least one shared ISM band with WLAN.

Figure 6A:
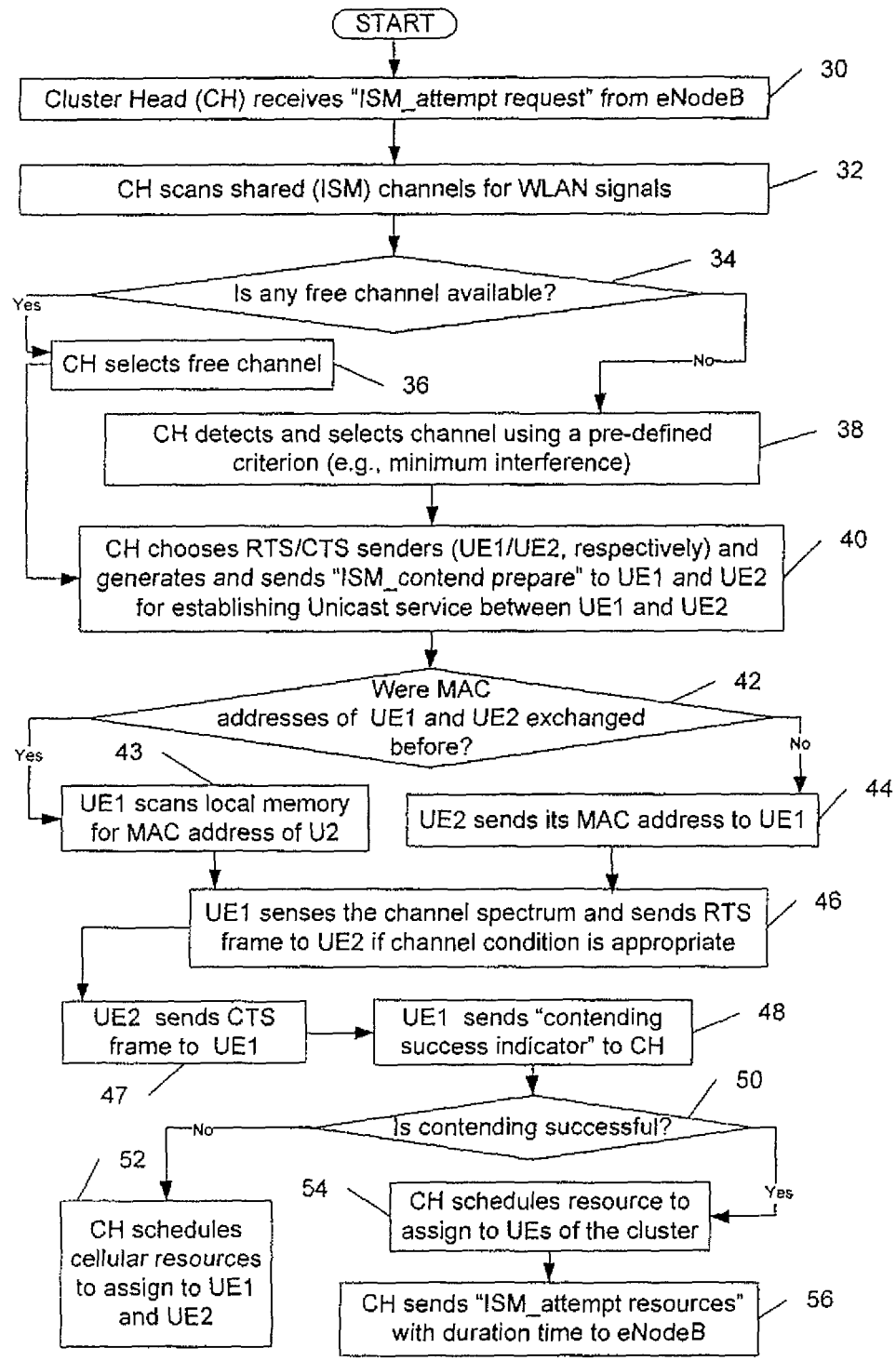
FIGS. 6a and 6b are a flow chart (FIG. 6a) and a complimentary signaling procedure chart (FIG. 6b) illustrating a unicast service implementation, according to an embodiment of the invention.
Figure 6B:
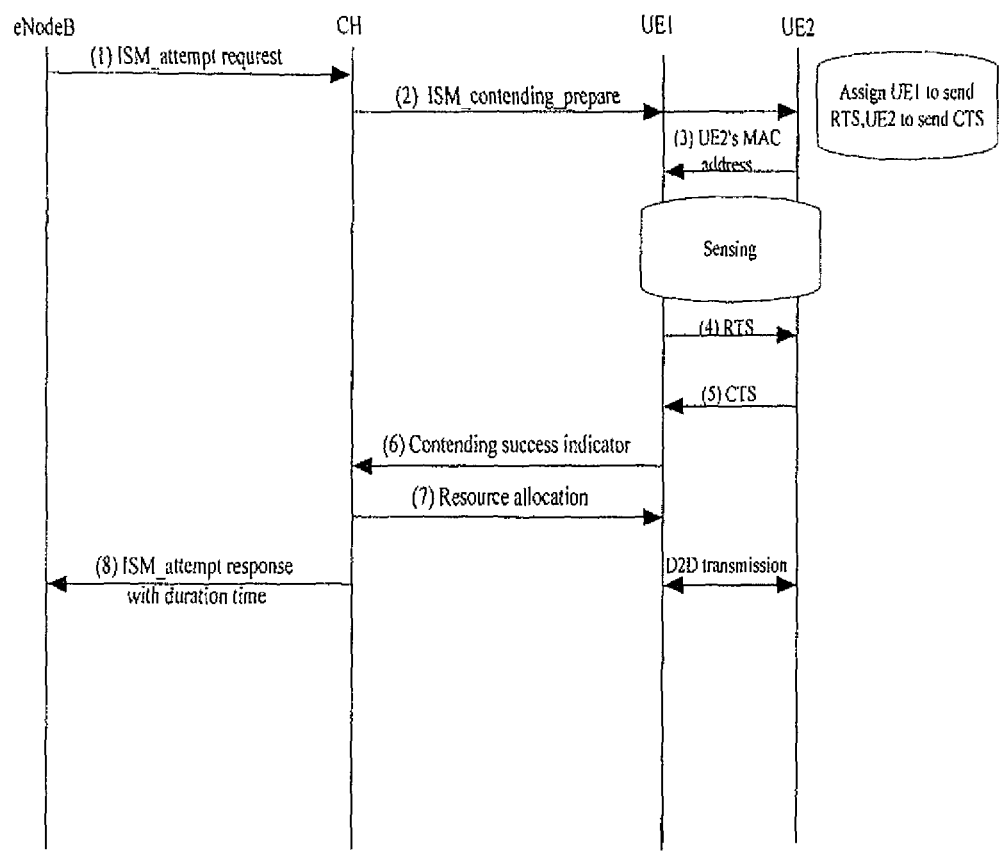

FIGS. 6a and 6b show an example among others of a flow chart (FIG. 6a) and a complimentary signaling procedure chart (FIG. 6b) illustrating a unicast service implementation, according to an exemplary embodiment of the invention. It is noted that the order of steps shown in FIGS. 6a and 6b is not absolutely required, so in principle, the various steps may be performed out of the illustrated order.

In a method according to this exemplary embodiment, as shown in FIG. 6a, in a first step 30 the cluster head (CH) receives an "ISM_attempt request" from the eNodeB, e.g., to heave the system load (also see signaling 1 in FIG. 6b). In the next step 32, the CH scans shared channels for the WLAN signals. In a next step 34, it is determined by the CH whether any free shared channel (i.e., free of signals) is available. If this is the case, the CH selects this free channel and then the process goes to step 40.

However, if it is determined in step 34 that there is no free channel available, in a next step 38, the CH detects and selects a shared channel using a pre-defined criterion (e.g., minimum interference energy/signal in the channel). Then in step 40, the CH chooses a service type (e.g., the unicast service), RTS/CTS senders (e.g., UE1 and UE2, as also shown in FIG. 6b) and then generates and sends an "ISM_contend_prepare" message (e.g., see signaling 2 in FIG. 6b) to the UE1 and UE2 for establishing a unicast service between the UE1 and UE2.

An example of the "ISM_contend_prepare" signaling for the unicast service is shown in Table 2. Since the CH manages the cluster, it knows the service requirements in the cluster and can choose the service type, the corresponding RTS/CTS sender and the duration field needed. For example, as seen from the example in Table 2, the UE1 is chosen to be the RTS sender, and the UE2 is chosen to be the CTS sender. Also, the CH knows whether the MAC address of the involved UEs has been exchanged before. If this is the first time for the involved UE, the 'MAC address flag' is set to 0, otherwise it is set to 1.

TABLE 2

An example of an "ISM_contend_prepare" signaling for unicast service.

| Information item | Value |
| --- | --- |
| Service type | 0 |
| RTS sender | UE1's C-RNTI |
| CTS sender | UE2's C-RNTI |
| Duration | According to the service requirement |
| Contending Channel | The channel number chosen by the CH |
| MAC address flag | 0 |

Continuing in FIG. 6a, in step 42, it is determined (e.g., by the UE1 and UE2 from the "ISM_contend_prepare" message, depending on the MAC address flag being 0 or 1) whether the MAC addresses of UE1 and UE2 were exchanged before. If that is not the case, in step 43, the UE2 may send its MAC address to the UE1 (also see signaling 3 in FIG. 6b). However, if it is determined that the MAC addresses of UE1 and UE2 were exchanged before, in step 44, the UE1 may retrieve the MAC address of the UE2 by scanning its own memory.

In a next step 46 the UE1 senses the channel spectrum of the contending channel chosen by the CH and send a RTS frame to the UE2 (also see signaling 4 in FIG. 6b) if the channel condition is appropriate, as a start of the extended CSMA/CA mechanism applying IEEE 802.11 standards (see FIGS. 3 and 4). In a next step 47, if the UE2 receives the corresponding RTS frame, it sends a CTS frame to the UE1 (also see signaling 5 in FIG. 6b). If the UE1 receives the respective CTS frame, the UE1 and UE2 then occupy the shared band channel with the unicast transmission.

In a next step 48, the UE1 sends a "contending success indicator" message to the CH to inform whether the contending is successful or not (also see signaling 6 in FIG. 6b). Thus, it may be determined by the CH in step 50 shown in FIG. 6a, whether the contending was successful. If this is not the case, in step 52, the CH may schedule cellular resources to assign to the UE1 and UE2 (i.e., not using shared channel). However, if it is determined that the contending was successful, in a next step 54, the CH may schedule resource to assign to the UE1 and UE2 and possibly to other cluster UEs (also see signaling 7 in FIG. 6b). For example, if the UE1 and UE2 have successfully contend one of the shared channel with 22 MHz bandwidth according to WLAN specifications, the spectrum may be too much for only one D2D pair, therefore the D2D pair may inform the CH about it and the CH may allocate the 22 MHz shared spectrum to the other cluster UEs as well.

Figure 7A:
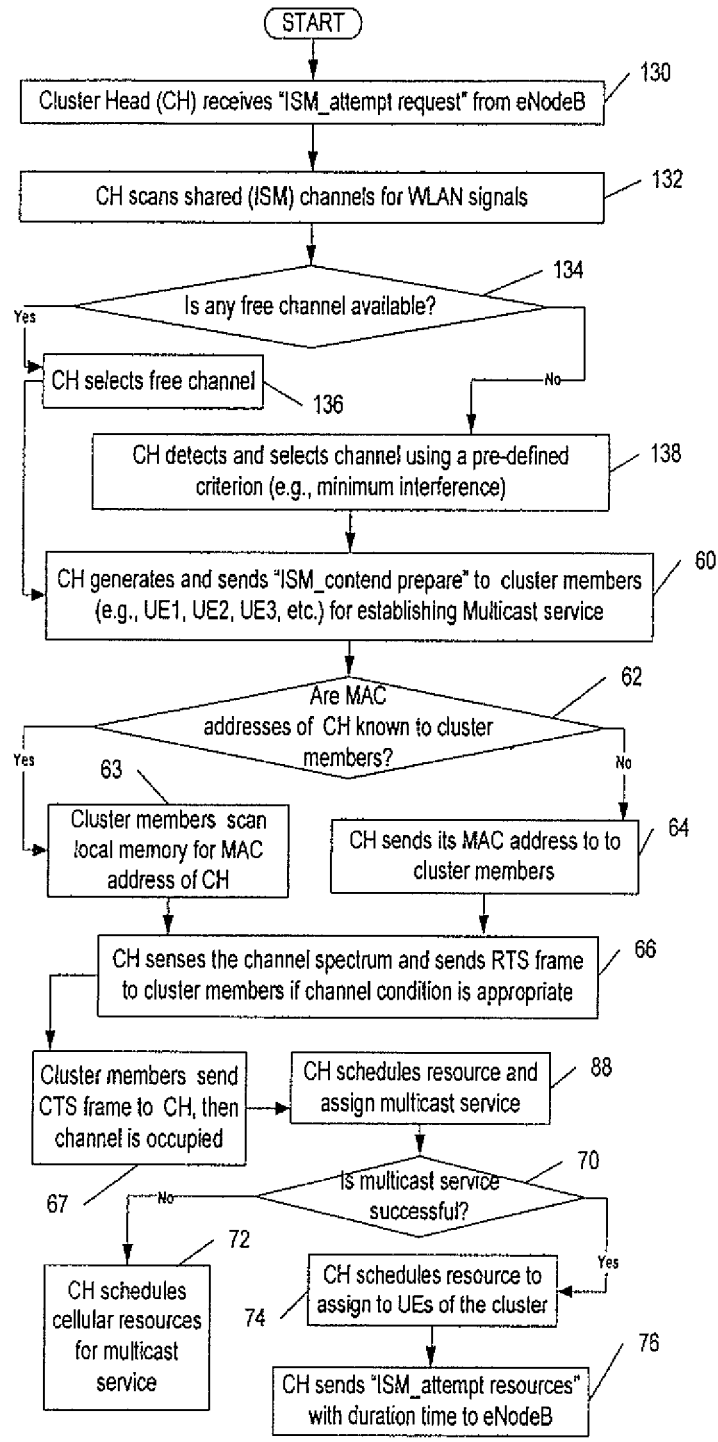
FIGS. 7a and 7b are a flow chart (FIG. 7a) and a complimentary signaling procedure chart (FIG. 7b) illustrating a multicast service implementation, according to an embodiment of the invention.
Figure 7B:
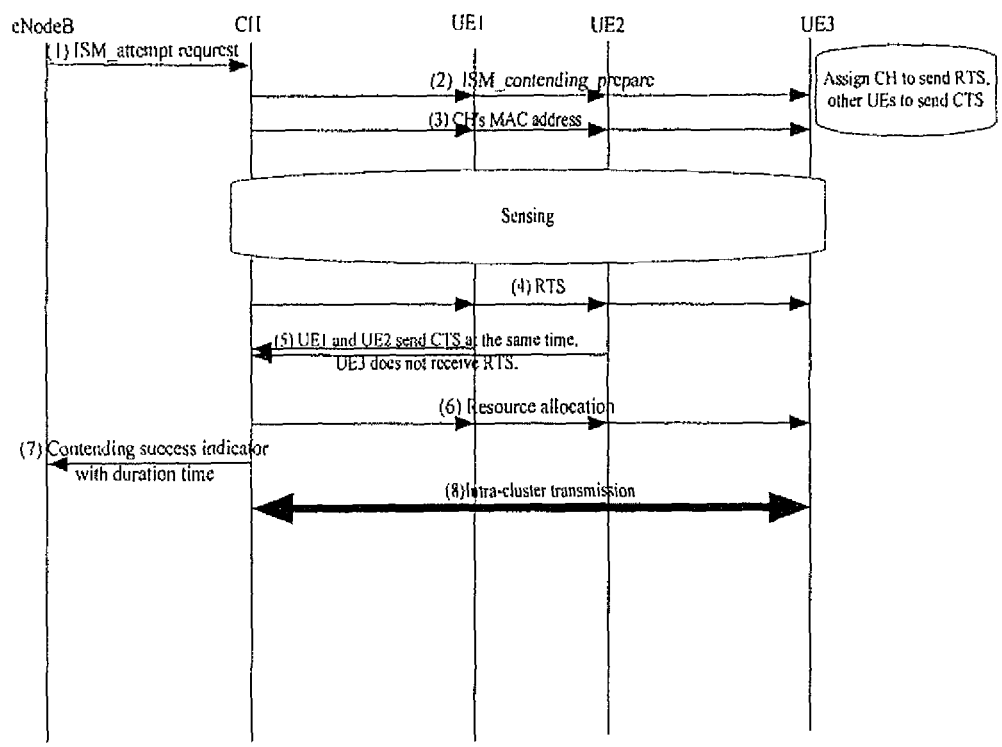

In a final step 56, the CH sends an "ISM_attempt resources" message with the transmission time duration to the eNodeB (also see signaling 8 in FIG. 7b). Then the eNB may allocate the cellular resource which has been previously allocated to the cluster to other usage in the cellular system during the transmission time duration reported by the cluster head.

FIGS. 7a and 7b show of a flow chart (FIG. 7a) and a complimentary signaling procedure chart (FIG. 7b) illustrating an exemplary multicast service implementation, according to an embodiment of the invention. It is noted that the order of steps shown in FIGS. 7a and 7b is not absolutely required, so in principle, the various steps may be performed out of the illustrated order.

In a method according to this embodiment of the invention, as shown in FIG. 7a, in a first step 130, the cluster head (CH) receives an "ISM_attempt request" from the eNodeB (also see signaling 1 in FIG. 7b). In a next step 132, the CH scans shared band channels for the WLAN signals. In a next step 134, it is determined by the CH whether any free shared channel (i.e., free of signals) is available. If this is the case, the CH selects this free channel and then the process goes to step 60.

However, if it is determined in step 134 that there is no free channel available, in a next step 138, the CH detects and selects a shared channel using a pre-defined criterion (e.g., minimum interference energy/signal in the channel). Then in step 60, the CH chooses a service type (e.g., a multicast service), RTS/CTS senders (e.g., CH, UE1, UE2, UE3, etc., as shown in FIG. 7b) and then generates and sends an "ISM_contend_prepare" message (e.g., see signaling 2 in FIG. 7b) to other UEs of the cluster for establishing a multicast service between the CH and the other UEs of the cluster.

An example of the "ISM_contend_prepare" signaling for multicast service is shown in Table 3. Since the CH manages the cluster, it knows the service requirements in the cluster and can choose the service type, the corresponding RTS/CTS sender and the duration field needed. For example, as seen from the example in Table 3, the CH is chosen to be the RTS sender, and the other UEs of the cluster are chosen to be the CTS senders. Also, the CH knows whether the MAC address of the involved UEs has been exchanged before. If this is the first time for the involved UE, the 'MAC address flag' is set to 0, otherwise it is set to 1.

TABLE 3

An example of an "ISM_contend_prepare" signaling for multicast service.

| Information item | Value |
| --- | --- |
| Service type | 0 |
| RTS sender | UE1's C-RNTI |
| CTS sender | UE2's C-RNTI |
| Duration | According to the service requirement |
| Contending Channel | The channel number chosen by the CH |
| MAC address flag | 0 |

Further in FIG. 7a, in step 62, it is determined (e.g., by the other UEs of the cluster from the "ISM_contend_prepare" message, depending on the MAC address flag being 0 or 1) whether the MAC address of the CH was exchanged with other UEs of the cluster before. If that is not the case, in step 63, the CH sends its MAC address (e.g., using a 48-bit format) to the other UEs (also see signaling 3 in FIG. 7b). However, if it is determined that the MAC address of the CH was exchanged with other UEs of the cluster before, in step 64, the other UEs of the cluster may retrieve the MAC address of the CH by scanning their own memories.

In a next step 66, the CH senses the channel spectrum of the contending (selected) channel and send a RTS frame to the other UEs of the cluster (also see signaling 4 in FIG. 7b) if the channel condition is appropriate, with the RA field in the RTS frame (as shown herein in FIG. 4a) to be the CH's MAC address. In a next step 67 if other UEs of the cluster receive the corresponding RTS frame from the CH, they send a CTS frame to the CH (also see signaling 5 in FIG. 7b, wherein the CTS frames are sent by the UE1 and UE2 but not by the UE3). If the CH receives the respective CTS frames from all or selected (even just one) UEs, the channel may then be occupied by the cluster for the multicast service as intended.

As noted in FIG. 7b, the CH did not receive the CTS frame from the UE3 probably because the UE3 never received the RTS frame. Therefore in one embodiment, the channel may be occupied by the cluster for the multicast service until the CTS frame is received by the CH from at least one UE in the cluster (i.e., no need for all the UEs in the cluster to reply with CTS frames). This is because as long as WLAN stations hear a CTS frame, they will backoff from using the shared channel so it can be used for the multicast service by the cluster. In an alternative embodiment, the channel may not be occupied by the cluster for the multicast service until the CTS frame is received by the CH from all UEs in the cluster to assure that none of the UEs are subject to hidden terminal problem.

Thus, it may be determined by the CH in step 70 shown in FIG. 7a, whether the contending was successful. If this is not the case, in step 72, the CH may schedule cellular resources to assign to the cluster for multicast services (i.e., not using shared channel). However, if it is determined that the contending was successful, in a next step 74, the CH may schedule a resource to assign to the UEs of the cluster (also see signaling 6 in FIG. 7b). For example, when the UEs of the cluster have successfully contend one of the shared channel with 22 MHz bandwidth according to WLAN specifications, the spectrum may be too much for the current multicast service, therefore the CH may allocate the 22 MHz shared spectrum to another unicast D2D service in the cluster.

In a final step 76, the CH may send an "ISM_attempt resources" message with the transmission duration time to the eNB (also see signaling 7 in FIG. 7b). Then the eNB may allocate the cellular resource which has been previously allocated to the cluster to other usage in the cellular system during the transmission time duration reported by the cluster head.

Thus, the exemplary embodiments disclosed herein provide a complete solution for coordination of a cellular cluster such as LTE (e.g., TD-LTE) cluster with a WLAN system on the shared band. The disclosed solution achieves co-existence with the WLAN systems. Since the LTE cluster obeys the WLAN CSMA/CA mechanism and act like a virtual WLAN STA, the contending procedure is fair to both. One embodiment of the invention also provides a solution for the multicast service while the original RTS/CTS mechanism in the WLAN standards cannot support the multicast service. Also, the cellular radio resource can be saved and the system load of the eNB can be lightened, because after the service inside the cluster will occupy the shared band, the eNB may allocate the cellular resource previously allocated to the cluster to other usage in the cellular system/network.

Figure 8:
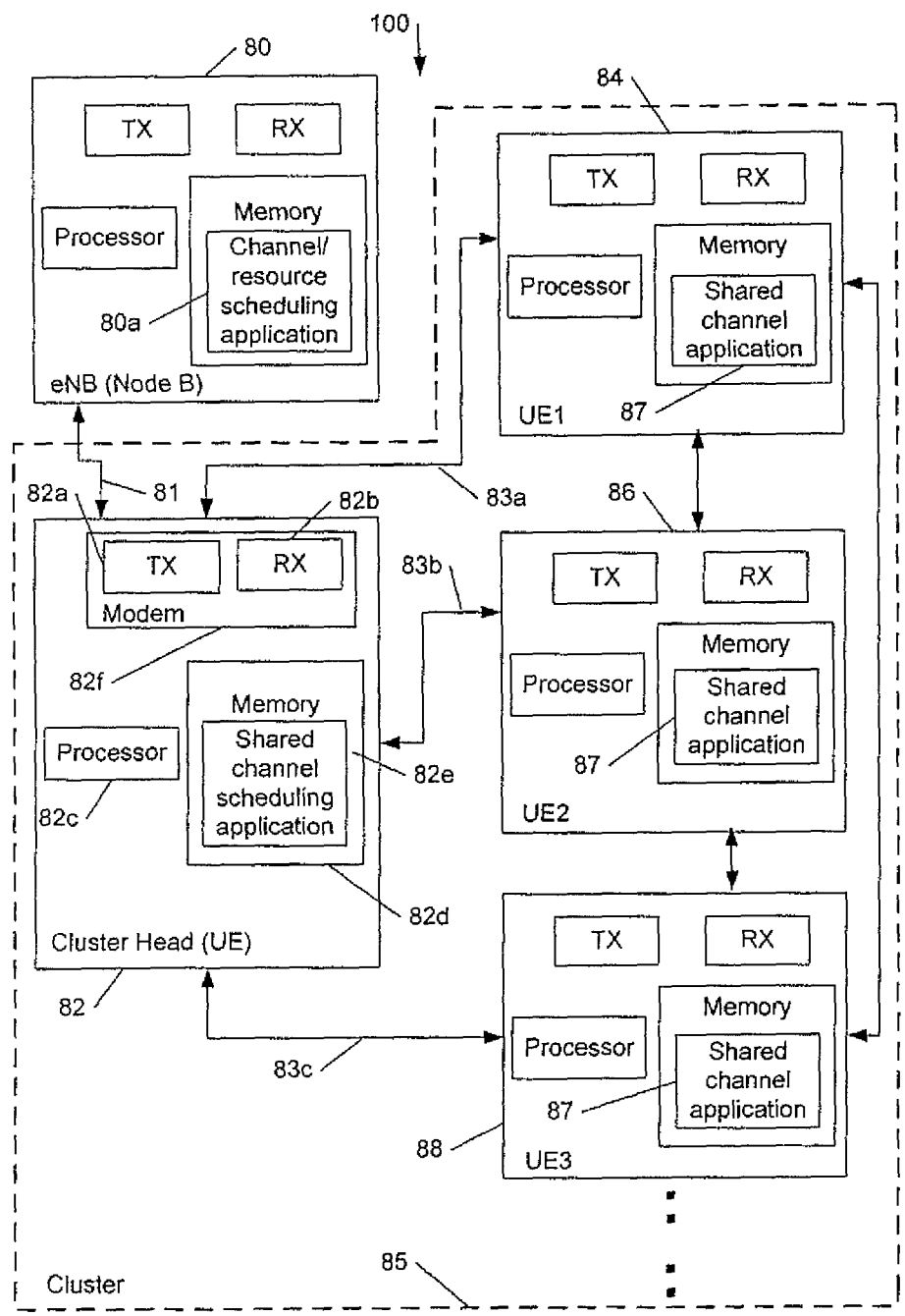
FIG. 8 is block diagram of LTE wireless devices for practicing exemplary embodiments, according to an embodiment of the invention.

FIG. 8 shows an example among others of a block diagram demonstrating LTE devices including an eNB 80, a cluster head 82 of a cluster 85 and other UEs of the cluster 84, 86, 88, comprised in a cellular network 100, according to an embodiment of the invention. FIG. 8 is a simplified block diagram of various electronic devices and apparatus that are suitable for use in practicing the exemplary embodiments of this invention, e.g., in reference to FIGS. 5, 6a, 6b, 7a, 7b and Tables 1-3, and a specific manner in which components of an electronic device are configured to cause that electronic device to operate. Each of the UEs 82, 84, 86, 88, etc., may be implemented as a mobile phone, a wireless communication device, a camera phone, a portable wireless device and the like.

The CH 82 may comprise, e.g., at least one transmitter 82a at least one receiver 82b, at least one processor 82c at least one memory 82d and a shared channel management application module 82e. The transmitter 82a and the receiver 82b and corresponding antennas (not shown in FIG. 8) may be configured to provide wireless communications with, e.g., other UEs 84, 86 and 88 of the cluster 85 over a wireless links 83a, 83b, 83c, respectively, using at least two bands (radio frequencies): at least one band for radio (cellular) communication and another band for the at least one shared ISM band with WLAN, according to the embodiment of the present patent application. The transmitter 82a and the receiver 82b may be generally means for transmitting/receiving and may be implemented as a transceiver, or a structural equivalence (equivalent structure) thereof. It is further noted that the same requirements and considerations are applied to transmitters and receivers of the other UEs 84, 86, 88 etc. of the cluster 85.

Furthermore, the cluster head 82 may further comprise communicating means such as a modem 82f, e.g., built on an RF front end chip of the CH 82, which also carries the TX 82a and RX 82b for bidirectional wireless communications via data/control wireless links 81, 83a, 83b, 83e. The same concept may apply to other devices 80, 84, 86 and 88 shown in FIG. 8.

Various embodiments of the at least one memory 82d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 82c include but are not limited to general purpose computers, special purpose computers, microprocessors, digital signal processors (DSPs) and multi-core processors. Similar embodiments are applicable to memories and processors in other devices 80, 84, 86, 88 shown in FIG. 8.

The shared channel management application module 82e may provide the shared channel management functionality for establishing and managing a wireless communication on the shared channel within the cluster 85 as described herein and illustrated in FIGS. 6a, 6b, 7a and 7b. The module 82e may be implemented as an application computer program stored in the memory 82d, but in general it may be implemented as a software, a firmware and/or a hardware module or a combination thereof. In particular, in the case of software or firmware, one embodiment may be implemented using a software related product such as a computer readable memory, computer readable medium or a computer readable storage structure comprising computer readable instructions (e.g., program instructions) using a computer program code (i.e., the software or firmware) thereon to be executed by a computer processor.

Furthermore, the module 82e may be implemented as a separate block or may be combined with any other module/block of the cluster head 82 or it may be split into several blocks according to their functionality. Moreover, it is noted that all or selected modules of the cluster head 82 may be implemented using an integrated circuit (e.g., using an application specific integrated circuit, ASIC).

The other UEs of the cluster 84, 86, 88, etc. may have similar components as the CH 82, as shown in FIG. 8, such that the above discussion about components of the cluster head 82 is fully applied to the components of the UEs 84, 86, 88, etc. The shared channel application module 87 in the UEs 84, 86, 88, is similar to the module shared channel management application module 82e in the CH 82, but is designed to facilitate performing corresponding functions for establishing and managing a wireless communication on the shared channel within the cluster 85 as described herein and illustrated in FIGS. 6a, 6b, 7a and 7b. The module 87 may be implemented as a software, a firmware and/or a hardware module or a combination thereof. In particular, in the case of software or firmware, one embodiment may be implemented using software related product such as a computer readable memory, a computer readable medium or a computer readable storage structure comprising computer readable instructions (e.g., program instructions) using a computer program code (i.e., the software or firmware) thereon to be executed by a processor.

Furthermore, the module 87 may be implemented as a separate block or may be combined with any other module/block of the cluster head 87 or it may be split into several blocks according to their functionality. Moreover, it is noted that all or selected modules of the UEs 84, 86, 88, etc. may be implemented using an integrated circuit (e.g., using an application specific integrated circuit, ASIC).

The eNB 80 is also shown in FIG. 8. The components of the eNB 80 (e.g., transmitter, receiver, processors, memory) in cellular systems/networks are well known in the art. A channel/resource scheduling module 80a of the eNB 80 may be designed to facilitate implementations of various embodiments of the invention as illustrated in FIGS. 6a, 6b, 7a and 7b. In particular, generating and providing "ISM_attempt request" to the CH 80 over a wireless link 81 in step 30 shown in FIGS. 6a and 7a (corresponding to signaling 1 in FIGS. 6b and 7b) is an important added function of the block 80a in reference to implementing embodiments of the present invention.

Also, after receiving, e.g., in step 56, or 76 (FIGS. 6a and 7a) a confirmation that contending was successful (the shared channel is successfully used within the cluster) with the transmission time duration, the eNB may allocate the cellular resource which has been allocated to the cluster to other usage in the cellular system during the transmission time duration reported by the cluster head.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

The invention claimed is:

1. A method of coordinating use of a shared band by devices in two different wireless networks, the method being performed by one of a plurality of user equipments in a cluster, the method comprising:
    for the plurality of user equipments in the cluster and that communicate on a cellular wireless network:
    selecting a channel in a license-exempt frequency band shared by the cluster and devices that communicate on another wireless network that is different from the cellular wireless network;
    determining which user equipment is to send a request message on the channel;
    determining which user equipment is to reply to the request message with a clear message;
    compiling a contend-prepare message comprising an indication of the selected channel and indications of the user equipments to send request and clear messages for transmission of the contend-prepare message on a cellular band of the cellular wireless network; and
    sending the contend-prepare message to the plurality of user equipments in the cluster.

2. The method of claim 1, wherein the license-exempt frequency band is an industrial-scientific-medical band and another wireless network is a wireless local area network.

3. The method of claim 1, wherein the cellular wireless network is a long term evolution cellular system, a long term evolution advanced cellular system or a time division duplex long term evolution cellular system.

4. The method of claim 1, wherein before said selecting, the method comprises:
receiving a request from a Node B to establish a wireless communication within the cluster in the license-exempt frequency band.

5. The method of claim 1, wherein said selecting the channel is based on a lack of any signal or a minimum signal interference compared to other channels in the license-exempt frequency band.

6. The method of claim 1, wherein a wireless communication on the channel is a unicast communication between two user equipments in the cluster.

7. The method of claim 6, wherein the contend-prepare message is sent on the cellular band by the one of the plurality of user equipments, which is a cluster head of the cluster at least to the two user equipments in the cluster indicating that a first user equipment of the two user equipments is selected to send said request message and a second user equipment of the two user equipments is selected to reply with said clear message, the contend-prepare message comprises an indication whether the first user equipment has a medium access control address of the second user equipment, wherein, in response to the contend-prepare message, the medium access control address of the second user equipment is recovered from a memory of the first user equipment or provided to the first user equipment by the second user equipment.

8. The method of claim 7, wherein said unicast communication between the two user equipments of the cluster is ready to start on said channel after:
sensing the channel by the first user equipment, sending the request message comprising the medium access control address of the second user equipment by the first user equipment to the second user equipment, and receiving the clear message by the first user equipment from the second user equipment.

9. The method of claim 8, wherein the method further comprises:
receiving, by the cluster head, a contending success indication from the first user equipment;
scheduling and assigning, by the cluster head, a resource in the cluster; and
sending, by the cluster head, a confirmation of successful contending including a transmission time duration on the channel in the license-exempt frequency band.

10. The method of claim 1, wherein a wireless communication on the channel is a multicast communication between a cluster head and one or more user equipments of the cluster.

11. The method of claim 10, wherein the contend-prepare message is sent on the cellular band by the cluster head of the cluster to other user equipments of the cluster indicating that the cluster head is selected to send said request message and the other user equipments of the cluster are selected to reply with said clear message, the contend-prepare message comprises indication whether the other user equipments have a medium access control address of the cluster head, wherein, in response to the contend-prepare message, the medium access control address of the cluster head is recovered from memories of the other user equipments or provided to the other user equipments by the cluster head.

12. The method of claim 11, wherein said multicast communication between the cluster head and at least two user equipments of the cluster is ready to start on the channel after:
sensing the channel by the cluster head, sending, by the cluster head, the request message comprising the medium access control address of the cluster head to the other user equipments of the cluster, and receiving the clear message by the cluster head from the one or more user equipments of said other user equipments.

13. The method of claim 12, wherein the method further comprises:
scheduling and assigning, by the cluster head, a resource in the cluster; and
sending, by the cluster head, a confirmation of successful contending including a transmission time duration on the channel in the license-exempt frequency band.

14. The method of claim 1, wherein said contend-prepare message comprises an indication of a transmission time duration on the selected channel, the transmission time duration being determined according to traffic requirements.

15. An apparatus that coordinates use of a shared band by devices in two different wireless networks, comprising:
a processing system comprising at least one processor and a memory that stores processing instructions that, when executed by the at least one processor, cause the at least one processor to:
select a channel in a license-exempt frequency band shared by a cluster of user equipments that communicated on a cellular wireless network and devices that communicate on another wireless network that is different from the cellular wireless network, the apparatus being part of the cluster:
determine which user equipment is to send a request message on the channel;
determine which user equipment is to reply to the request message with a clear message;
compile a contend-prepare message comprising an indication of the selected channel and indications of the user equipments to send request and clear messages for transmission of the contend-prepare message on a cellular band of the cellular wireless network; and
send the contend-prepare message to the plurality of user equipments in the cluster.

16. The apparatus of claim 15, further comprising a memory configured to store a shared channel application.

17. The apparatus of claim 15, wherein said apparatus is configured to receive a request from a Node B to establish a wireless communication within the cluster in the license-exempt frequency band.

18. The apparatus of claim 15, wherein the license-exempt frequency band is an industrial-scientific-medical band and another wireless network is a wireless local area network.

19. The apparatus of claim 15, wherein selecting the channel by the apparatus is based on a lack of any signal or a minimum signal interference compared to other channels in the license-exempt frequency band.

20. A non-transitory computer readable memory encoded with computer-readable instructions that, when executed by one of a plurality of user equipments in a cluster, cause the one of the plurality of user equipments to perform a method of coordinating use of a shared band by devices in two different wireless networks, the method comprising:
for the plurality of user equipments in the cluster and that communicate on a cellular wireless network:

selecting a channel in a license-exempt frequency band shared by the cluster and devices that communicate on another wireless network that is different from the cellular wireless network;

determining which user equipment is to send a request message on the channel;

determining which user equipment is to reply to the request message with a clear message;

compiling a contend-prepare message comprising an indication of the selected channel and indications of the user equipments to send request and clear messages for transmission of the contend-prepare message on a cellular band of the cellular wireless network; and sending the contend-prepare message to the plurality of user equipments in the cluster.

* * * * *